US006430559B1

(12) United States Patent
Zhai

(10) Patent No.: US 6,430,559 B1
(45) Date of Patent: Aug. 6, 2002

(54) METHOD AND APPARATUS FOR PROFILE SCORE THRESHOLD SETTING AND UPDATING

(75) Inventor: Chengxiang Zhai, Pittsburgh, PA (US)

(73) Assignee: Claritech Corporation, Pittsburgh, PA (US)

( * ) Notice: Subject to any disclaimer, the term of this patent is extended or adjusted under 35 U.S.C. 154(b) by 0 days.

(21) Appl. No.: 09/432,005

(22) Filed: Nov. 2, 1999

(51) Int. Cl.$^7$ .............................................. G06F 17/30

(52) U.S. Cl. .............................................. 707/5; 707/3

(58) Field of Search ........................ 707/5, 3; 704/256, 704/203

(56) References Cited

U.S. PATENT DOCUMENTS

| | | | | |
|---|---|---|---|---|
| 5,442,778 A | * | 8/1995 | Pedersen et al. ................ | 707/5 |
| 5,640,553 A | * | 6/1997 | Schultz ........................... | 707/5 |
| 5,717,914 A | * | 2/1998 | Husick et al. .................. | 707/5 |
| 5,737,734 A | * | 4/1998 | Schultz ........................... | 707/5 |
| 5,822,731 A | * | 10/1998 | Schultz ....................... | 704/256 |
| 5,926,812 A | * | 7/1999 | Hilsenrath et al. ............. | 707/5 |
| 5,963,940 A | * | 10/1999 | Liddy et al. .................... | 707/5 |
| 6,076,088 A | * | 6/2000 | Paik ................................ | 707/5 |
| 6,240,408 B1 | * | 5/2001 | Kaufman ........................ | 707/3 |

OTHER PUBLICATIONS

Liddy, E. D.; Paik, W; Yu, E. S., "Text Categorization for Multiple Users Based on Semantic Features from Users Based on Semantic Features from a Machine–Readable Dictionary", ACM Transaction on Information System, vol. 12, No. 3, Jul. 1994, pp. 278–295.*

Raghavan, V. V. and Jung, G. S., "A critical investigation of recall and precision as a measure of retrieval system performance", ACM Transaction on Information Systems, vol. 7, No. 3, Jul. 1989, pp. 205–229.*

* cited by examiner

Primary Examiner—John Breene
Assistant Examiner—Mohammad Ali
(74) Attorney, Agent, or Firm—Blaney, Harper, Jones, Day Reavis & Pogue

(57) ABSTRACT

A novel approach for filtering documents involves the use of delivery ratio threshold setting technique to set an initial profile score threshold and the use of beta-gamma regulation for dynamic threshold updating. A group of documents is scored pursuant to a user profile. The score for each document is indicative of the relevance of the corresponding document to the user profile. The score can be compared with a profile score threshold to decide if the document should be accepted or rejected. According to one aspect of the invention, the initial threshold is set to a score threshold that approximates an expected ratio of acceptable documents calibrated with respect to a set of reference documents. According to another aspect of the invention, the score threshold can be updated based on the accumulated example documents, user's relevance judgment, and the user's utility function. The accumulated example documents are first scored against a profile and a ranked list of scored documents is obtained. Each position at the ranked list corresponds to a candidate score threshold as well as a utility value computed based on the relevance status of the example documents. From these candidate threshold points, an optimal utility threshold and a zero utility threshold are determined. Using the optimal utility threshold and the zero utility threshold, a new utility threshold is calculated by interpolating between estimates of the optimal utility threshold and the zero utility threshold. This new utility threshold is used for subsequent information retrieval and filtering.

6 Claims, 3 Drawing Sheets

METHOD AND APPARATUS FOR PROFILE SCORE THRESHOLD SETTING AND UPDATING

FIELD OF THE INVENTION

The present invention relates to the field of computerized information search and retrieval systems. More specifically, this invention relates to a method and apparatus for setting and updating the score threshold of a user profile.

BACKGROUND OF THE INVENTION

Given the vast amount of information accessible by computer systems, particularly on distributed databases, more efficient methods of information retrieval are continually needed. Often the use of search tools returns a large volume of data, much of which may not be relevant to the user's ultimate needs. The user is forced to parse through large volumes of information to find ultimately that which is relevant. It is therefore desirable to develop a system whereby a corpus or a dynamic stream of documents is sufficiently filtered such that only relevant information is returned to the user.

Profile-based filtering involves the interaction of a document or group of documents with a user profile. A stream of incoming documents is compared with certain criteria, contained in a user profile, and then either rejected or ultimately provided to the user. Conceptually, a user profile (i.e., a binary document classifier) consists of three key elements: a term vector, inverse document frequency or "IDF" statistics, and a score threshold. The first two elements are used to assign a score to the document, and the third is used to make the decision of whether to accept or reject the document as relevant or not relevant to the user's search parameters. The process of profiling is distinct from database searching in that profiling evaluates and selects or rejects individual documents as they stream in rather than evaluating all documents of a database and then selecting the best scoring ones as in traditional database searching.

The basic approach to profile-based filtering involves a two-step procedure. For each document-profile pair, a relevance score is computed. That score is then applied to a profile score threshold to make the binary decision to accept or reject the document for the profile. It is important that the profile score threshold be low enough such that it allows sufficient amounts of relevant documents to be returned to the user. However, if the profile score threshold is set too low, a large number of documents will be returned, necessitating further filtering. For any user profile, the optimal threshold should represent the best tradeoff between accepting more relevant documents and avoiding accepting non-relevant documents, where the best tradeoff is determined by the user's utility preference.

Setting the profile score threshold can be divided into two separate parts: (a) an initial score threshold setting, before there are any relevance judgments from the user, and (b) updating the score threshold, at any point when relevance judgments are fed back into the system. Updating the profile score threshold adapts the filtering process to the user's specific requirements and thus provides a more effective means of information retrieval.

Consequently, in view of the need for more efficient searching techniques and filtering methods, a method by which the profile score threshold may be initially set and then updated during use is highly desirable. A properly set profile score threshold enables the user to search a group of documents in a comprehensive manner, such that fewer relevant documents are missed by the user, but likewise may prevent the user from becoming inundated with a large number of documents.

SUMMARY OF THE INVENTION

An approach for initially setting the profile score threshold and updating the profile score threshold during use in a profile-based filtering system is described. The initial threshold is set based on an expected acceptance ratio of documents specified by the user. To set an initial threshold, a set of reference documents (i.e., a reference database) is selected. Each reference document is scored against the profile and all the reference documents are sorted by their scores. The initial threshold is then set to such a score that the ratio of reference documents with a score above it and those with a score below it equals the expected acceptance ratio. When user relevance feedback is available, the threshold can be updated based on a specific utility function specified by the user. To update a threshold, first a set of historical example documents is identified for any profile. Each example document is scored against the profile and all the example documents are sorted by their scores. Assuming each example document score as a possible candidate threshold, a utility value can be computed for the candidate threshold. Using the utilities at each candidate threshold, the point of highest utility and the point of zero utility are then determined. An updated utility threshold is then calculated by interpolating between the threshold at the point of highest utility and the threshold at the point of zero utility, according to the formulas disclosed herein. The updated utility threshold is then used for subsequent information retrieval.

DESCRIPTION OF THE PREFERRED EMBODIMENT

The approach for retrieving information in accord with the invention involves the use of any profile scoring mechanism along with two threshold setting methods referred to as delivery ratio threshold setting and "beta-gamma" regulation respectively. The profile scoring mechanism assigns a score to any document with respect to the profile. The score represents the relevance of the document to a user criteria defined by the profile. The delivery ratio threshold setting technique sets an initial score threshold for a profile by approximating a specified ratio of documents to be delivered or accepted for a profile. The approximation is based on a set of reference documents that approximate the documents which will be processed. The beta-gamma regulation technique selects a new profile threshold $\theta'$ by interpolating between estimates of the "optimal" threshold $\theta_{opt}$ and the "zero" threshold $\theta_{zero}$ over the relevance judgments and the historical training data the system has accrued at any given point. The updated profile score threshold is used in subsequent filtering applications to provide a more accurate and more efficient method of information retrieval. Such an updating of threshold may be as frequent as needed.

Figure 1:
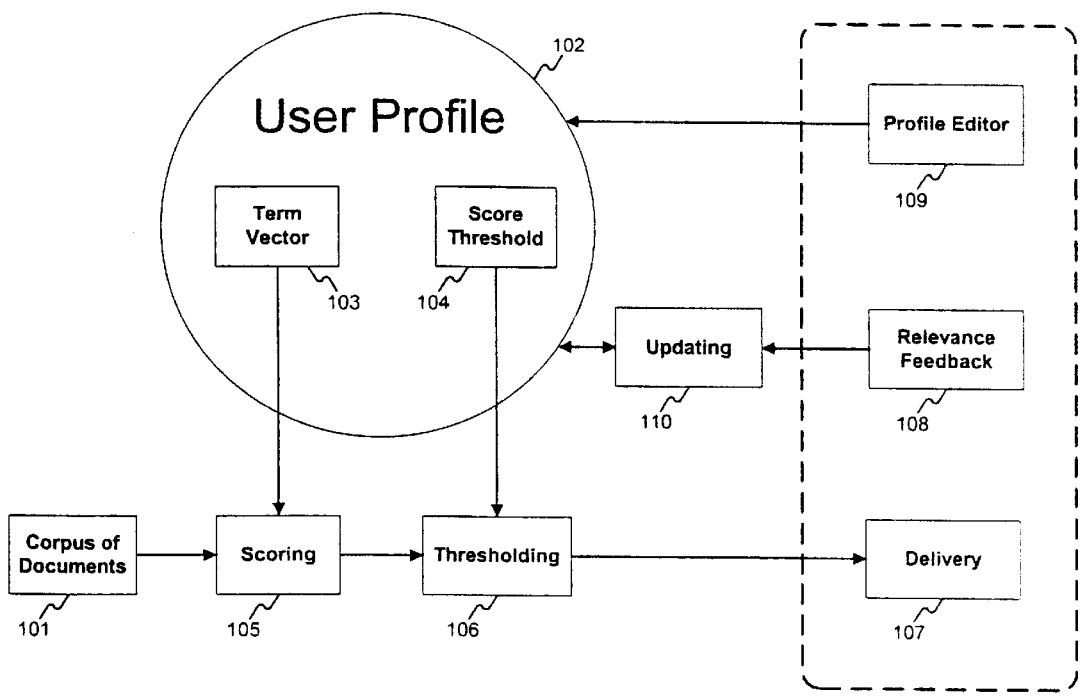
FIG. 1 is a flow chart that illustrates a method according to the present invention for retrieving relevant information from a corpus or a stream of documents.

The approach for retrieving information using delivery ratio threshold setting for initial profile score threshold setting and using beta-gamma regulation for profile score threshold updating according to an embodiment of the invention is now described in more detail with reference to FIGS. 1–5. FIG. 1 illustrates the general method for retrieving relevant information from a corpus of documents 101. According to one embodiment of the invention, a document is a text file containing one or more strings of characters or other symbols that are used to form more complex constructs. For example, strings of characters may form words, phrases, sentences, and paragraphs. The constructs contained in the documents are not limited to constructs or forms associated with any particular language.

In this embodiment, the user profile 102 incorporates a term vector 103 and a score threshold 104. The term vector 103 is used to generate a score in step 105 for each document in the corpus of documents 101. The score threshold 104 is used for deciding to accept or reject documents in step 106 with respect to each document based upon the scoring obtained in step 105. If the score of a document is above the score threshold, the document will be accepted, otherwise, it will be rejected.

In the preferred embodiment, the corpus of documents 101 is processed one document at a time. For each document, noun phrases and individual words are extracted as indexing terms, so as to obtain a term vector. In an alternative embodiment, the corpus of document 101 can be segmented into small subsets of "chunks" of documents. A chunk of documents can be processed together to increase efficiency.

The scoring in step 105 is performed using standard statistical analysis techniques such as vector space-type scoring. In a vector space-type scoring system, a score is generated by comparing the similarity between a profile (or query) Q and the document D and evaluating their shared and disjoint terms over an orthogonal space of all terms. For example, the similarities score can be computed by the following formula:

$$S(Q_i, D_j) = \frac{Q_i \cdot D_j}{|Q| \cdot |D|} = \frac{\sum_{k=1}^{t}(q_{ik} \cdot d_{ik})}{\sqrt{\sum_{k=1}^{t} q_{ik}^2} \cdot \sqrt{\sum_{k=1}^{t} d_{ik}^2}}$$

where $Q_i$ refers to terms in the profile and $D_j$ refers to terms in the document. The vector space-type scoring technique can be illustrated on the following sample set of profiles and documents:

| Terms | $Q_1$ | $Q_2$ | $D_1$ | $D_2$ |
|---|---|---|---|---|
| dog | 1 | 1 | 2 | — |
| cat | 1 | — | — | 1 |
| hat | 1 | — | 1 | — |
| bat | 1 | — | — | — |
| mat | 1 | 1 | — | — |
| hut | — | 1 | 2 | — |

| Terms | $Q_1$ | $Q_2$ | $D_1$ | $D_2$ |
|---|---|---|---|---|
| cut | — | 1 | — | 2 |
| luck | — | — | 3 | — |
| buck | — | — | 1 | — |
| muck | — | — | — | 3 |

In this table, the Terms column lists a union of all the terms contained in the two documents $D_1$ and $D_2$. The scores of $D_1$ and $D_2$ refer to the frequency of those terms as they appear in the documents. The scores of $Q_1$ and $Q_2$ refer to frequency of the terms as they appear in the query. The similarity score of the query $Q_1$ to document $D_1$ is computed as:

$$S_G(Q_1, D_1) = \frac{(1 \cdot 2) + (1 \cdot 1)}{\sqrt{1^2 + 1^2 + 1^2 + 1^2 + 1^2} \cdot \sqrt{2^2 + 1^2 + 2^2 + 3^2 + 1}}$$

Also, the similarity of the profile $Q_1$ to document $D_2$ is computed as: $S_G(Q_1, D_1)=0.12$.

Figure 2:
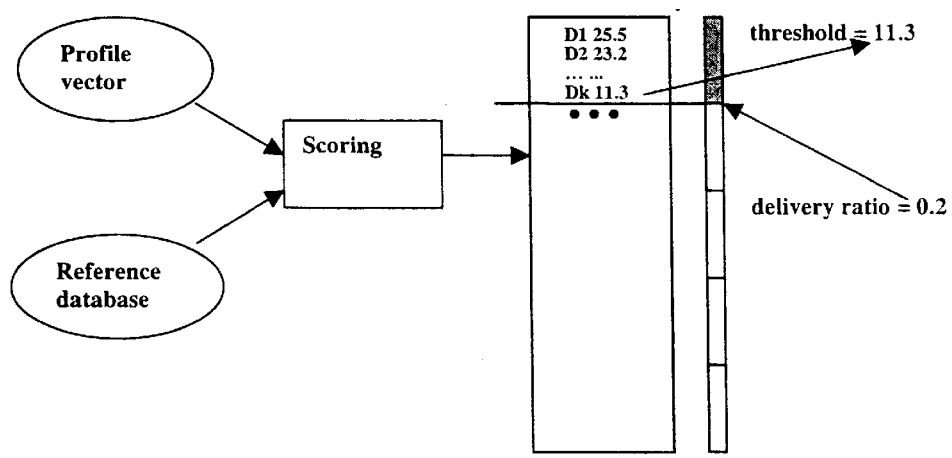
FIG. 2 is a graph that illustrates a method according to the present invention for setting an initial threshold of a user profile in an information retrieval/filtering system.

As can be seen from the above example, the similarity score of profile $Q_1$ to document $D_1$ is higher than the similarity score of profile $Q_1$ to document $D_2$. As a result, the similarity score provides a relative measure of the relevance of a document to the profile. A highly-scored document is more likely to be relevant to a profile than a low-scoring one. Therefore, a high score threshold would only allow a few high-scoring documents to be accepted. Most of these high-scoring documents may be expected to be relevant to the profile. On the other hand, a low score threshold would allow more documents to be accepted. However, the ratio of actually relevant documents among these documents—referred to as precision—may be low. The correct threshold can only be determined according to the user's actual preference concerning the number amount of documents accepted as well as the expected precision of the accepted documents. FIG. 2 illustrates an embodiment of the invention used to set an initial score threshold 104. A set of reference documents is identified as reference database. The profile term vector is used to assign a score to each reference document. The reference documents are sorted by their scores to generate a sorted list of reference documents. The expected delivery ratio provided by the user determines a cutoff point at the list. Assuming that the user expects to accept a fraction r of documents from the corpus of documents(e.g., 10%), the cutoff point will be the k-th document in the ranked list, where K=r×N, and N equals the number of documents in the reference database. The score at the cutoff point is taken as the assigned threshold. In special cases when K<1 or when K>N, heuristic extrapolation is applied.

The thresholding operation in step 106 determines whether a document will be delivered to the user in step 107. Documents yielding a score from step 105 above the score threshold 104 are accepted as relevant in step 106 and delivered to the user in step 107. Conversely, documents yielding a score below the score threshold 104 are rejected as not relevant and discarded.

In step 108, relevance feedback for each accepted document is then obtained based upon the user's particular needs. The documents that the system has already processed serve as a training corpus for updating the user profile 102 in step 110 for the filtering of subsequent documents in the corpus of documents 101. This updating of the user profile 102 in step 110 can be done as frequently as needed. The frequency of updating can be determined based on the amount of new delivered documents or the time elapse since last updating. Optionally, profile editor 109 may be used to update user profile 102 directly without regard to the results obtained in step 107.

In the preferred embodiment, the user profile 102 is updated in step 110 by expanding the term vector 103 and re-estimating, according to the present invention, the score threshold 104. To expand the term vector 103, standard Rocchio feedback may be used, where the centroid vector of the relevant document vectors is computed and the terms are ranked according to their centroid weight. Preferably, however, the K best-ranked terms are assigned a uniform weight before they are merged into the current term vector 103. K grows heuristically with the number of relevant documents N available for training, according to the functions: K=10+10·log(N+1).

Figure 3:
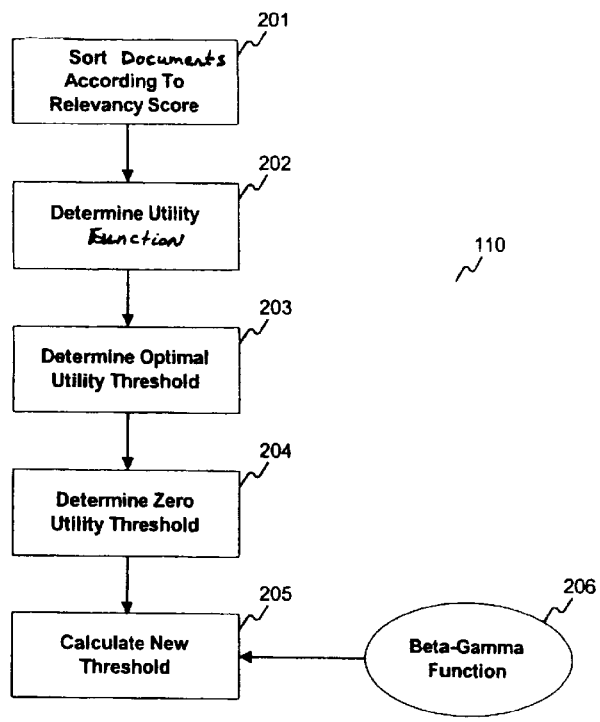
FIG. 3 is a flow chart that illustrates a method according to the present invention for updating the utility threshold of a user profile in an information retrieval/filtering system.

FIG. 3 illustrates an embodiment of the present invention used to update the score threshold 104 in step 110. In step 201, documents from a reference dataset (or initial training set) are scored against the profile vector, and are sorted according to their scores. At each position in the ranked list, a utility value $U_i$ can be computed by assuming a threshold that is equal to the score of the document at that position. Therefore, each position yields a candidate score threshold and a corresponding utility value. Thereafter, the "optimal" utility threshold $\theta_{opt}$ is determined in step 203, and the "zero" utility threshold $\theta_{zero}$ is determined in step 204. The optimal utility threshold $\theta_{opt}$ is the threshold that yields the highest utility over the accumulated training data. The zero utility threshold $\theta_{zero}$ is the highest threshold below the optimal utility threshold $\theta_{opt}$ that gives a non-positive utility over the training data under the assumption that all documents that were rejected are non-relevant.

Using the optimal utility threshold $\theta_{opt}$ and the zero utility threshold $\theta_{zero}$, a new profile utility threshold $\theta'$ is then calculated in step 205 by interpolating between the empirical optimal utility threshold $\theta_{opt}$ and the zero utility threshold $\theta_{zero}$ over the historical training data the system has accrued at any given point. As documents are filtered using this process, they are added to the historical training data for the system. In this way, the optimum utility is updated as new documents are evaluated.

The interpolation between the optimal and zero utility threshold using a constant parameter α, may be calculated according to the following evaluation formula:

$$\theta = \alpha \cdot \theta_{zero} + (1-\alpha) \cdot \theta_{opt}$$

The parameter α can be empirically set to any value between zero and one (alpha-regulation). In the preferred embodiment, α is expressed as a function of two further parameters, β and γ (beta-gamma function 206), as reflected in the following calculation:

$$\alpha = \beta + (1-\beta) \cdot e^{-\gamma M}$$

in which M equals the number of training documents upon which the relevance feedback in step 108 of FIG. 1 is performed. In the preferred embodiment, the new profile utility threshold $\theta'$ replaces the previous score threshold 104 and is used along with the newly expanded term vector 103 to filter any subsequent documents in steps 105 and 106.

In writing the parameter α in terms of β and γ in the beta-gamma function 306, both aspects of the bias present in the optimal utility threshold $\theta_{opt}$ calculation are captured. First, γ represents a score bias correction factor that compensates for the relatively higher scores of relevant documents in the training corpus. Second, γ expresses that the estimated optimal utility threshold $\theta_{opt}$ approximates the true optimal utility threshold more closely when more judged training examples are available. The parameter γ is the inverse of the number of documents at which the profile utility threshold is placed at approximately the midpoint of the range between the optimal utility threshold $\theta_{opt}$ and the zero utility threshold $\theta_{zero}$. are available, the profile utility threshold will be somewhat lower. By contrast, if more than $1/\gamma$ training examples are available, the profile utility threshold will be somewhat higher.

Figure 4:
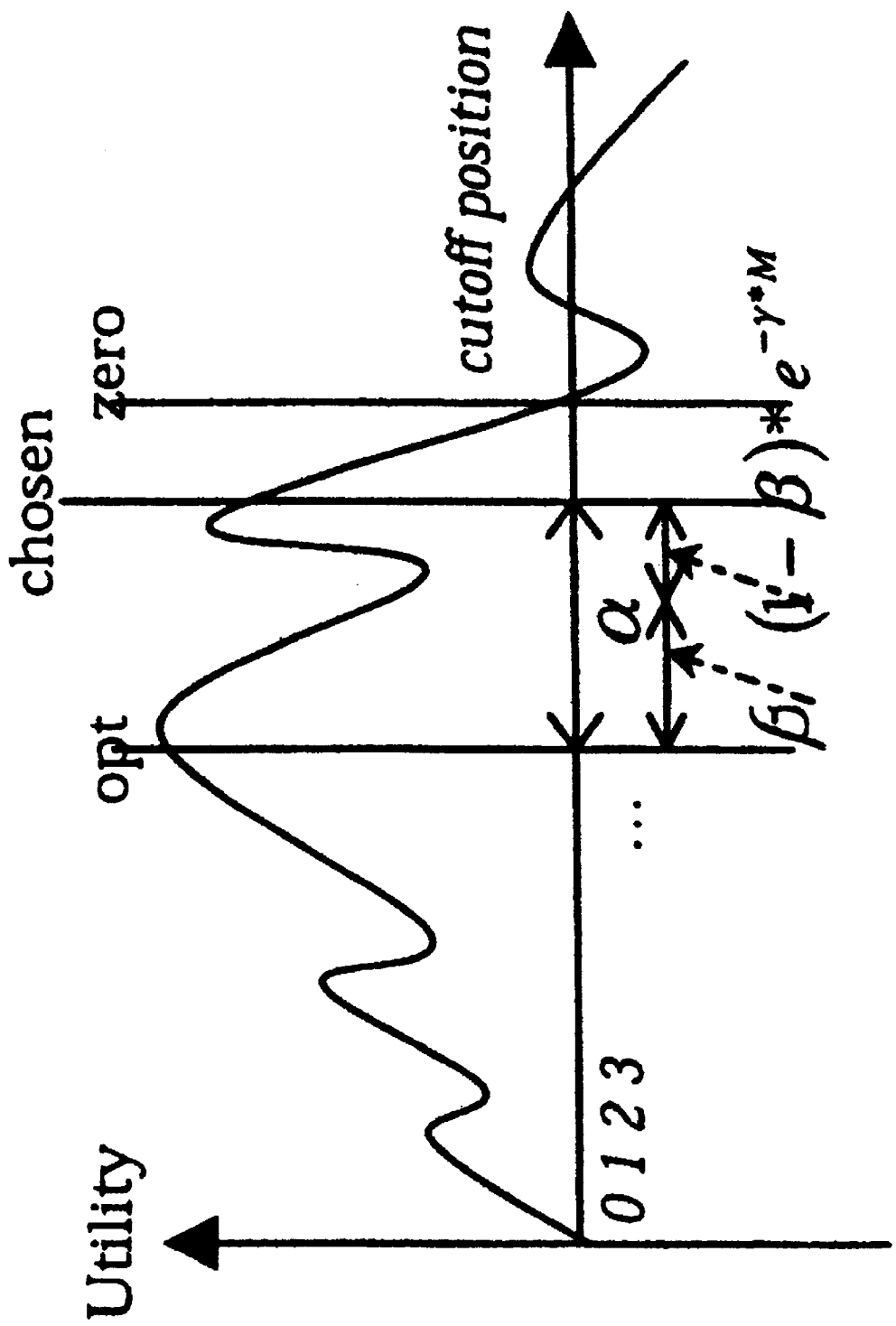
FIG. 4 is a graph that illustrates the parameters of the present invention used for updating the utility threshold.

FIG. 4 illustrates how a choice of the parameter α determines a cutoff point between the points of optimal and zero utility and how the parameters β and γ help to dynamically adjust parameter α according to the number M of judged documents in the training database. Given a ranked list of all of the documents in the training database sorted by their scores, their relevance, and a specific utility criterion, the utility value at each different cutoff position can be plotted. Each cutoff position corresponds to a utility threshold.

HARDWARE OVERVIEW

Figure 5:
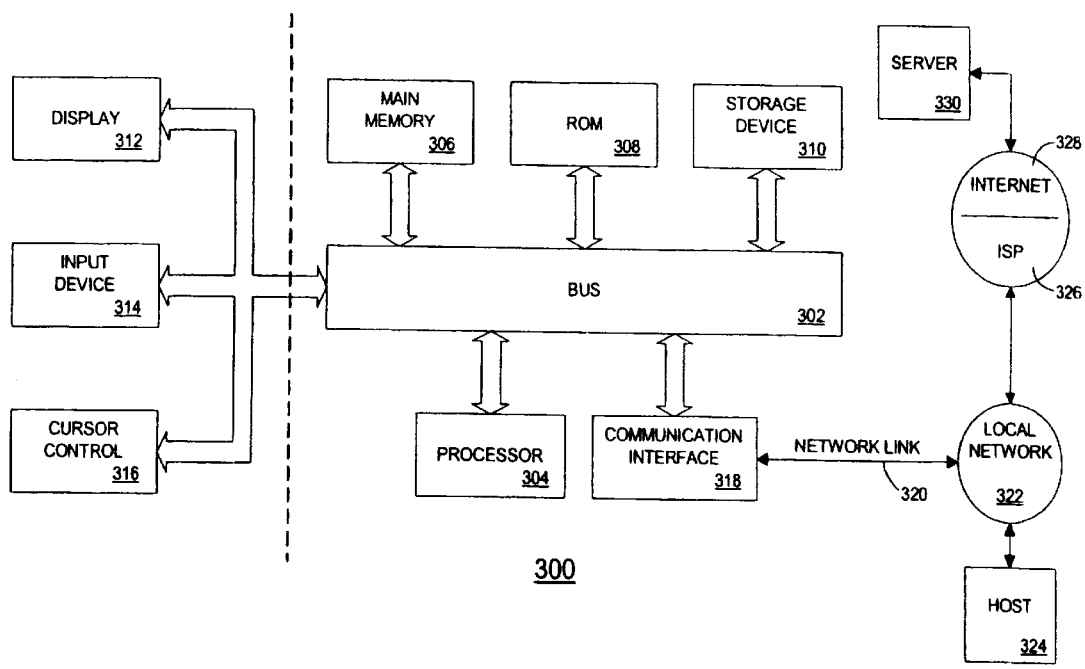
FIG. 5 is a block diagram of a computer system on which embodiments of the invention may be implemented.

FIG. 5 is a block diagram which illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device itypically has two degrees of freedom in two axes, a first axis (e.g., x) and a second axis (e.g., y), which allows the device to specify positions in a plane.

The invention is related to the use of computer system 300 to retrieving information using beta-gamma regulation of threshold updating. According to one embodiment of the invention, retrieving information using beta-gamma regulation of threshold updating is provided by computer system 300 in response to processor 304 executing sequences of instructions contained in main memory 306. Such instructions may be read into main memory 306 from another computer-readable medium, such as storage device 310. However, the computer-readable medium is not limited to devices such as storage device 310. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 306 causes processor 304 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals which carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet 328 for example, a server 330 might transmit a requested code for an application program through Internet 328, ISP 326, local network 322 and communication interface 318. In accordance with the invention, one such downloaded application provides for the retrieval of information using chunks of text as described herein.

The received code may be executed by processor 304 as it is received, and/or stored in storage device 310, or other non-volatile storage for later execution. In this manner, computer system 300 may obtain application code in the form of a carrier wave.

To measure the effectiveness of the present invention over simple linear interpolation (i.e., alpha regulation), 49 user profiles were used to filter about 250 megabytes of 1988 Associate Press news articles. A set of 1987 Wall Street Journal documents were used as an initial reference database. The initial threshold is set for all the profiles with a delivery ratio of 0.0005 using the present invention. The utility function used in the evaluation is the utility function UF1 defined below:

$$UF1 = 3 \cdot R - 2 \cdot N$$

where, R is the number of relevant documents accepted and N is the number of non-relevant documents accepted.

Three experiments were conducted. In one experiment, the initial threshold was kept without updating. The other two experiments update the threshold using the present invention in two different ways—one uses the alpha regulation and the other uses the beta-gamma regulation. Updating frequency is such that a profile will be updated whenever there are four new documents accepted for the profile. The UF1 utility value for each profile and their average are shown in the following table.

| Profile # | baseline (no updating) | α regulation (α = 0.3) | improve (α reg. over baseline) | β-γ regulation (β = 0.1, γ = 0.05) | improve (β-γ reg. over baseline) |
|---|---|---|---|---|---|
| 1 | −14 | −8 | 6 | −8 | 6 |
| 2 | −15 | −12 | 3 | −12 | 3 |
| 3 | −3 | 1 | 4 | −11 | −8 |
| 4 | 3 | 1 | −2 | 1 | −2 |
| 5 | 0 | 15 | 15 | 27 | 27 |
| 6 | −16 | −4 | 12 | −4 | 12 |
| 7 | 9 | 1 | −8 | 26 | 17 |
| 8 | −108 | −5 | 103 | −5 | 103 |
| 9 | −26 | 1 | 27 | −3 | 23 |
| 10 | 3 | 6 | 3 | 46 | 43 |
| 11 | −106 | −4 | 102 | −25 | 81 |
| 12 | −31 | 5 | 36 | −3 | 28 |
| 13 | −16 | −13 | 3 | −10 | 6 |
| 14 | −1 | 3 | 4 | 2 | 3 |
| 15 | 10 | −3 | −13 | −5 | −15 |
| 16 | −29 | −2 | 27 | −2 | 27 |
| 17 | 46 | 32 | −14 | 60 | 14 |
| 18 | −475 | −24 | 451 | −24 | 451 |
| 19 | −4 | −6 | −2 | −6 | −2 |
| 20 | 2 | 6 | 4 | 10 | 8 |
| 21 | 14 | 8 | −6 | 35 | 21 |
| 23 | 73 | 4 | −69 | 110 | 37 |
| 24 | 15 | −3 | −18 | −7 | −22 |
| 25 | −68 | −5 | 63 | −16 | 52 |
| 26 | −14 | 2 | 16 | −4 | 10 |
| 27 | −1 | 3 | 4 | 3 | 4 |
| 28 | −26 | −6 | 20 | −6 | 20 |
| 29 | −9 | −2 | 7 | −2 | 7 |
| 30 | −2 | −2 | 0 | −2 | 0 |
| 31 | −3 | 3 | 6 | −3 | 0 |

-continued

| Profile # | baseline (no updating) | α regulation (α = 0.3) | improve (α reg. over baseline) | β-γ regulation (β = 0.1, γ = 0.05) | improve (β-γ reg. over baseline) |
|---|---|---|---|---|---|
| 32 | −24 | −6 | 18 | −6 | 18 |
| 33 | −8 | −4 | 4 | −4 | 4 |
| 34 | −10 | −10 | 0 | −10 | 0 |
| 35 | −24 | −8 | 16 | −8 | 16 |
| 36 | 4 | 4 | 0 | 0 | −4 |
| 37 | −12 | −2 | 10 | −2 | 10 |
| 38 | 12 | 5 | −7 | 1 | −11 |
| 39 | −14 | −10 | 4 | −10 | 4 |
| 40 | 21 | −1 | −22 | 14 | −7 |
| 41 | −9 | −4 | 5 | −4 | 5 |
| 42 | 7 | 9 | 2 | −2 | −9 |
| 43 | −30 | 5 | 35 | −9 | 21 |
| 44 | 2 | −8 | −10 | −8 | −10 |
| 45 | −10 | −8 | 2 | −8 | 2 |
| 46 | −187 | −20 | 167 | −21 | 166 |
| 47 | 0 | −1 | −1 | −1 | −1 |
| 48 | −16 | −12 | 4 | −12 | 4 |
| 49 | 7 | 3 | −4 | 7 | 0 |
| 50 | −16 | −8 | 8 | −8 | 8 |
| Average | −22.42857143 | −1.714285714 | 20.71428571 | 1.448979592 | 23.87755102 |

These results show that threshold updating using the present invention (both the alpha regulation and the beta-gamma regulation) generally improves the utility values, and in some cases significantly, when compared with the performance without updating. The comparison between the alpha regulation and the beta-gamma regulation indicates that the beta-gamma regulation technique gives more stable utility performance and is more adaptive when a profile has the potential of achieving a high positive utility. For example, referring to topic 23, although the alpha regulation gives a very small utility, the beta-gamma regulation generates a very high positive utility.

While this invention has been particularly described and illustrated with reference to particular embodiments thereof, it will be understood by those skilled in the art that changes in the above description or illustrations may be made with respect to form or detail without departing from the spirit or scope of the invention.

I claim:

1. A computer-implemented method for filtering documents comprising the steps of:

selecting a document profile and an expected document delivery ratio;

scoring a reference set of documents according to said document profile;

determining an assigned score threshold corresponding to said expected document delivery ratio;

determining a utility function by calculating a utility for each of said documents in said reference set;

determining a first utility threshold based on said utility function, wherein said first utility threshold ($\theta_{opt}$) is the highest utility over said reference set;

determining a second utility threshold based on said utility function, wherein said second utility threshold ($\theta_{zero}$) is the highest utility below said first utility threshold that has a non-positive utility over said reference set;

interpolating between said first utility threshold and said second utility threshold to determine an updated score threshold; and filtering incoming documents based on said updated score threshold.

2. A method as in claim 1, wherein:

said interpolation is calculated according to the formula:

$$\theta = \alpha \cdot \theta_{zero} + (1-\alpha) \cdot \theta_{opt}$$

3. A method as in claim 2, wherein said parameter is calculated according to the formula:

$$\alpha = \beta + (1-\beta) \cdot e^{-\gamma M}$$

4. A system for filtering documents, comprising:

a computer coupled to a network wherein said computer receives documents over said network and transmits documents to an individual user over said network, wherein said user selects a document profile and an expected delivery ratio; and wherein said computer:

scores a reference set of documents according to said document profile;

determines an assigned score threshold corresponding to said expected document delivery ratio;

determines a utility function by calculating a utility for each of said documents in said reference set;

determines a first utility threshold based on said utility function, wherein said first utility threshold ($\theta_{opt}$) is the highest utility over said reference set;

determines a second utility threshold based on said utility function, wherein said second utility threshold ($\theta_{zero}$) is the highest utility below said first utility threshold that has a non-positive utility over said reference set;

interpolates between said first utility threshold and said second utility threshold to determine an updated score threshold; and filters incoming documents based on said updated score threshold.

5. A system as in claim 4, wherein:

said interpolation is calculated according to the formula:

$$\theta = \alpha \cdot \theta_{zero} + (1-\alpha) \cdot \theta_{opt}$$

6. A system as in claim 5, wherein said parameter is calculated according to the formula:

$$\alpha = \beta + (1-\beta) \cdot e^{-\gamma M}$$

* * * * *